(12) United States Patent
Wolf et al.

(10) Patent No.: US 12,519,495 B2
(45) Date of Patent: Jan. 6, 2026

(54) DIGITAL POST-DISTORTION SIGNALING

(71) Applicant: QUALCOMM Incorporated, San Diego, CA (US)

(72) Inventors: Guy Wolf, Rosh Haayin (IL); Igor Gutman, Ramat Gan (IL); Sharon Levy, Binyamina (IL); Gideon Shlomo Kutz, Ramat Hasharon (IL); Assaf Touboul, Netanya (IL); Noam Zach, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/302,167

(22) Filed: Apr. 26, 2021

(65) Prior Publication Data

US 2021/0344367 A1 Nov. 4, 2021

Related U.S. Application Data

(60) Provisional application No. 63/018,041, filed on Apr. 30, 2020.

(51) Int. Cl.
   *H04B 1/04* (2006.01)
   *H03F 1/32* (2006.01)
   *H04W 8/22* (2009.01)

(52) U.S. Cl.
   CPC ......... *H04B 1/0475* (2013.01); *H03F 1/3247* (2013.01); *H04W 8/22* (2013.01); *H03F 2200/451* (2013.01); *H04B 2001/0425* (2013.01)

(58) Field of Classification Search
   CPC .......... H04B 1/0475; H04B 2001/0425; H03F 1/3247; H03F 2200/451; H04W 8/22

USPC .......................................................... 375/262
See application file for complete search history.

(56) References Cited

U.S. PATENT DOCUMENTS

| | | | | |
|---|---|---|---|---|
| 11,444,733 | B2 * | 9/2022 | Levy | H04L 5/0048 |
| 2015/0049843 | A1 * | 2/2015 | Reuven | H04B 1/0475 |
| | | | | 375/296 |
| 2018/0167091 | A1 * | 6/2018 | Pratt | H04B 1/0483 |
| 2018/0316450 | A1 * | 11/2018 | Rico Alvarino | H04L 5/0053 |
| 2020/0286001 | A1 * | 9/2020 | Nguyen | G06N 20/20 |
| 2020/0336998 | A1 * | 10/2020 | Rahman | H04W 52/146 |
| 2020/0367051 | A1 * | 11/2020 | Wang | H04W 8/245 |
| 2021/0235258 | A1 * | 7/2021 | Takeda | H04L 1/1854 |
| 2022/0085934 | A1 * | 3/2022 | Choi | H04L 5/0051 |

FOREIGN PATENT DOCUMENTS

WO WO-2020009626 A1 * 1/2020 ........... H03F 1/3247

OTHER PUBLICATIONS

U.S. Appl. No. 17/846,350 (Year: 2022).*

* cited by examiner

*Primary Examiner* — Kevin M Burd
(74) *Attorney, Agent, or Firm* — Harrity & Harrity, LLP

(57) ABSTRACT

Various aspects of the present disclosure generally relate to wireless communication. In some aspects, a user equipment may transmit, to a base station (BS), UE capability information including transmission non-linearity information related to a digital post-distortion processing capability; and transmit, to the BS and after transmitting the UE capability information, signaling for digital post-distortion processing. Numerous other aspects are provided.

33 Claims, 7 Drawing Sheets

DIGITAL POST-DISTORTION SIGNALING

CROSS-REFERENCE TO RELATED APPLICATION

This patent application claims priority to U.S. Provisional Patent Application No. 63/018,041, filed on Apr. 30, 2020, entitled "DIGITAL POST-DISTORTION SIGNALING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for digital post-distortion signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting, to a base station (BS), UE capability information including transmission non-linearity information related to a digital post-distortion processing capability; and transmitting, to the BS and after transmitting the UE capability information, signaling for digital post-distortion processing.

In some aspects, a method of wireless communication, performed by a BS, may include receiving, from a UE, UE capability information including transmission non-linearity information related to a digital post-distortion processing capability; receiving, from the UE and after receiving the UE capability information, signaling for digital post-distortion processing; and performing post-distortion processing on the signaling based at least in part on receiving the signaling and based at least in part on the UE capability information.

In some aspects, a UE for wireless communication may include a memory and one or more processors coupled to the memory. The memory and the one or more processors may be configured to transmit, to a BS, UE capability information including transmission non-linearity information related to a digital post-distortion processing capability; and transmit, to the BS and after transmitting the UE capability information, signaling for digital post-distortion processing.

In some aspects, a base station for wireless communication may include a memory and one or more processors coupled to the memory. The memory and the one or more processors may be configured to receive, from a UE, UE capability information including transmission non-linearity information related to a digital post-distortion processing capability; receive, from the UE and after receiving the UE capability information, signaling for digital post-distortion processing; and perform post-distortion processing on the signaling based at least in part on receiving the signaling and based at least in part on the UE capability information.

In some aspects, a non-transitory computer-readable medium may store one or more instructions for wireless communication. The one or more instructions, when executed by one or more processors of a UE, may cause the one or more processors to transmit, to a BS, UE capability information including transmission non-linearity information related to a digital post-distortion processing capability; and transmit, to the BS and after transmitting the UE capability information, signaling for digital post-distortion processing.

In some aspects, a non-transitory computer-readable medium may store one or more instructions for wireless communication. The one or more instructions, when executed by one or more processors of a BS, may cause the one or more processors to receive, from a UE, UE capability information including transmission non-linearity information related to a digital post-distortion processing capability; receive, from the UE and after receiving the UE capability information, signaling for digital post-distortion processing; and perform post-distortion processing on the signaling based at least in part on receiving the signaling and based at least in part on the UE capability information.

In some aspects, an apparatus for wireless communication may include means for transmitting, to a BS, capability information including transmission non-linearity information related to a digital post-distortion processing capability;

and means for transmitting, to the BS and after transmitting the capability information, signaling for digital post-distortion processing.

In some aspects, an apparatus for wireless communication may include means for receiving, from a UE, UE capability information including transmission non-linearity information related to a digital post-distortion processing capability; means for receiving, from the UE and after receiving the UE capability information, signaling for digital post-distortion processing; and means for performing post-distortion processing on the signaling based at least in part on receiving the signaling and based at least in part on the UE capability information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
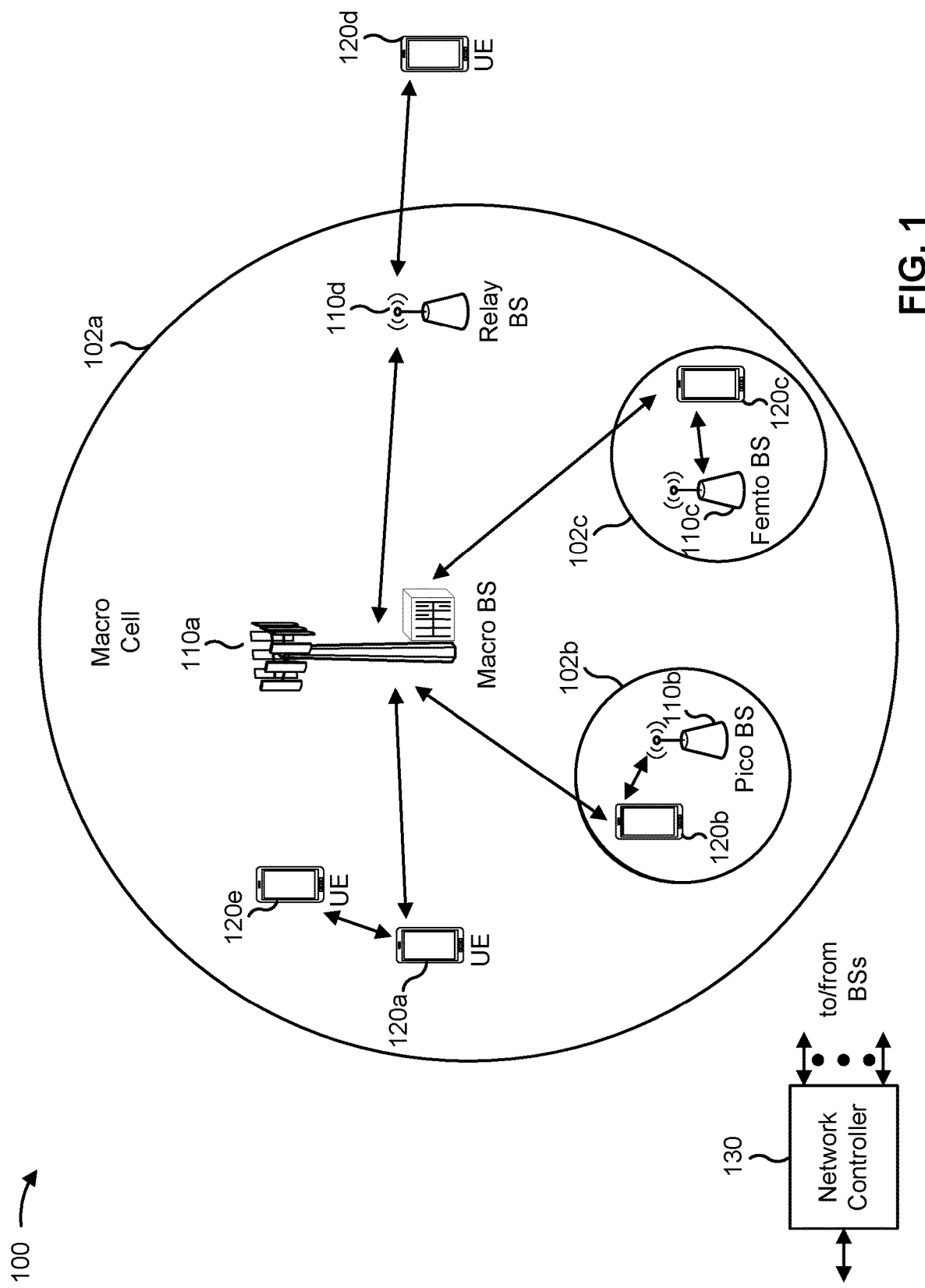
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
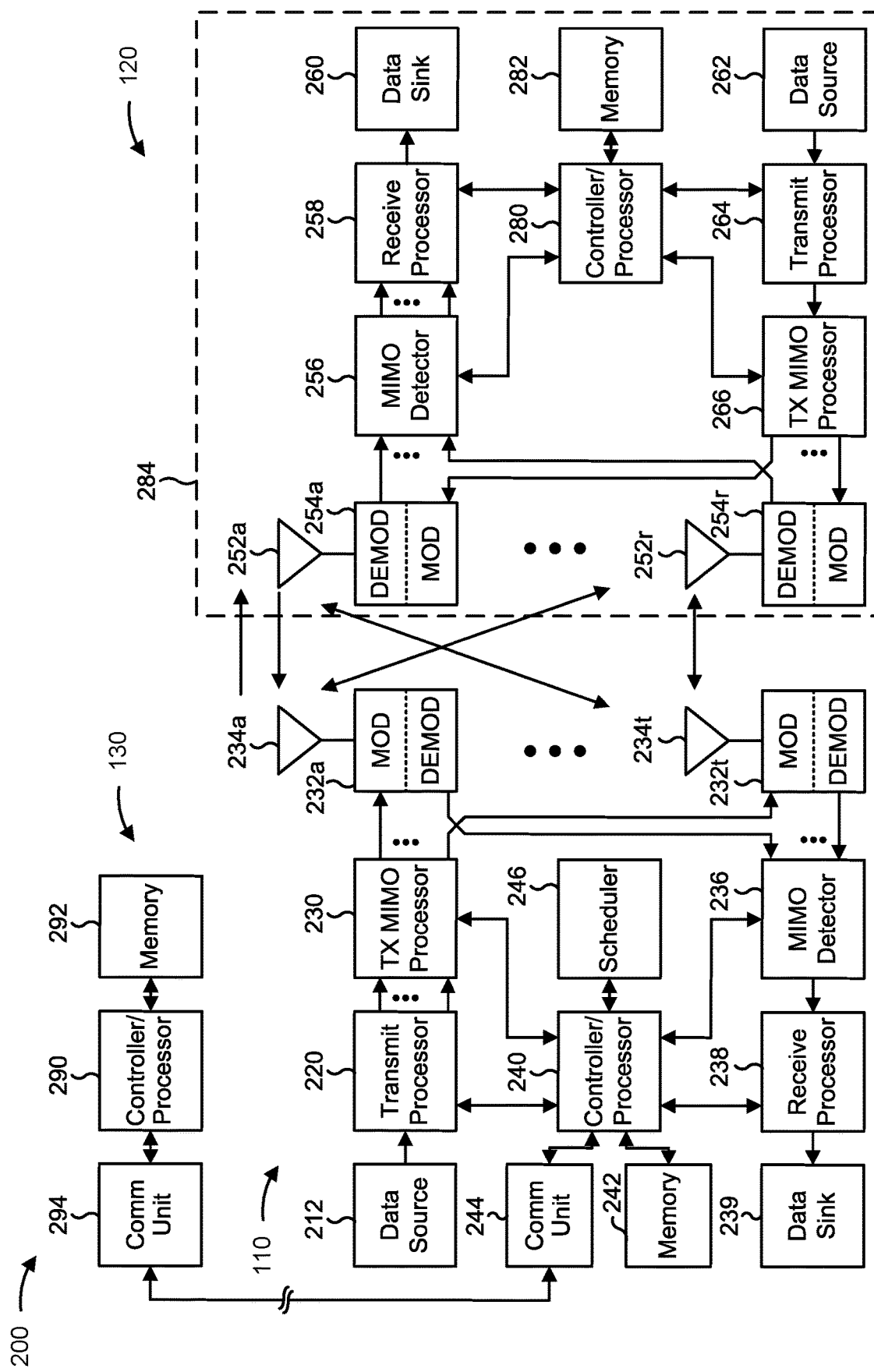
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with digital post-distortion signaling, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE includes means for transmitting, to a BS, UE capability information including transmission non-linearity information related to a digital post-distortion processing capability; and/or means for transmitting, to the BS and after transmitting the UE capability information, signaling for digital post-distortion processing. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a BS includes means for receiving, from a UE, UE capability information including transmission non-linearity information related to a digital post-distortion processing capability; means for receiving, from the UE and after receiving the UE capability information, signaling for digital post-distortion processing; and/or means for performing post-distortion processing on the signaling based at least in part on receiving the signaling and based at least in part on the UE capability information. The means for the base station (BS) to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, a transmitter device may, as power increases, transmit signals with increasing non-linearity. For example, a high-power amplifier (HPA) with a limited dynamic range (DR) may distort a transmitted signal as a result of a relatively higher peak to average power ratio. The non-linear distortion may be an in-band distortion, which affects link performance in connection with an error vector magnitude (EVM) amount, or out-band distortion, which causes adjacent channel interference (e.g., the transmitted signal interferes with other signals on neighboring frequency band). To avoid non-linearity and accompanying interference, the transmitter device may apply a power back-off value to reduce transmit power, thereby reducing non-linearity.

However, applying a power back-off value may result in reduced power efficiency (e.g., less available transmit power is used to transmit in a channel, thereby reducing range, signal to interference noise ratio, and/or the like). The transmitter may apply digital pre-distortion (DPD) processing to reduce non-linear distortion to less than a threshold level with a reduced level of power back-off, thereby increasing power efficiency relative to avoiding non-linear distortion using only a power back-off. However, although DPD processing may correct an in-dynamic range non-linearity affect, non-linearity may still cause a clipping effect (e.g., resulting from the limited dynamic range). This may limit an effectiveness of DPD processing and an associated power efficiency benefit of DPD processing. Moreover, use of DPD processing may be limited to relatively high transmit power values present at a cell edge and may not be used away from the cell edge.

To account for limitations of DPD processing, a receiver device may apply digital post-distortion (DPoD) processing. In DPoD processing, the receiver device may account for non-linearity-induced clipping. As a result, DPoD processing may be effective both away from and at a cell edge. However, some transmitters and receivers may not support DPoD processing in a network deployment, which may result in a threshold level of block error rate (BLER) when a transmitter attempts to transmit a signal for DPoD processing and the receiver is not capable of DPoD processing. Similarly, some transmitters may not be configured to compress signaling and/or increase transmit power (or reduce a power back-off value) to take advantage of a DPoD processing capability in a receiver.

Some aspects described herein enable DPoD signaling. For example, a UE may transmit UE capability information, which may include transmission non-linearity information relating to a DPoD capability. In this case, based at least in part on the UE capability information, a BS may set a DPoD configuration to enable DPoD processing of subsequent signaling from the UE. In this case, the BS and UE ensure that DPoD capability is enabled for a transmitter (e.g., the UE) and a receiver (BS) and enables UE capability-based optimization of DPoD behavior. In this way, the BS and UE enable use of DPoD processing when both the BS and UE are configured to take advantage of DPoD processing and avoid use of DPoD processing when one of the BS or the UE is not configured to take advantage of DPoD processing. Based at least in part on avoiding use of DPoD processing when the DPoD processing capability is not present in one of the BS or the UE, the BS and the UE avoid causing a threshold BLER, avoid unnecessary utilization of processing resources, avoid unnecessary utilization of communication resources, and/or the like.

Figure 3:
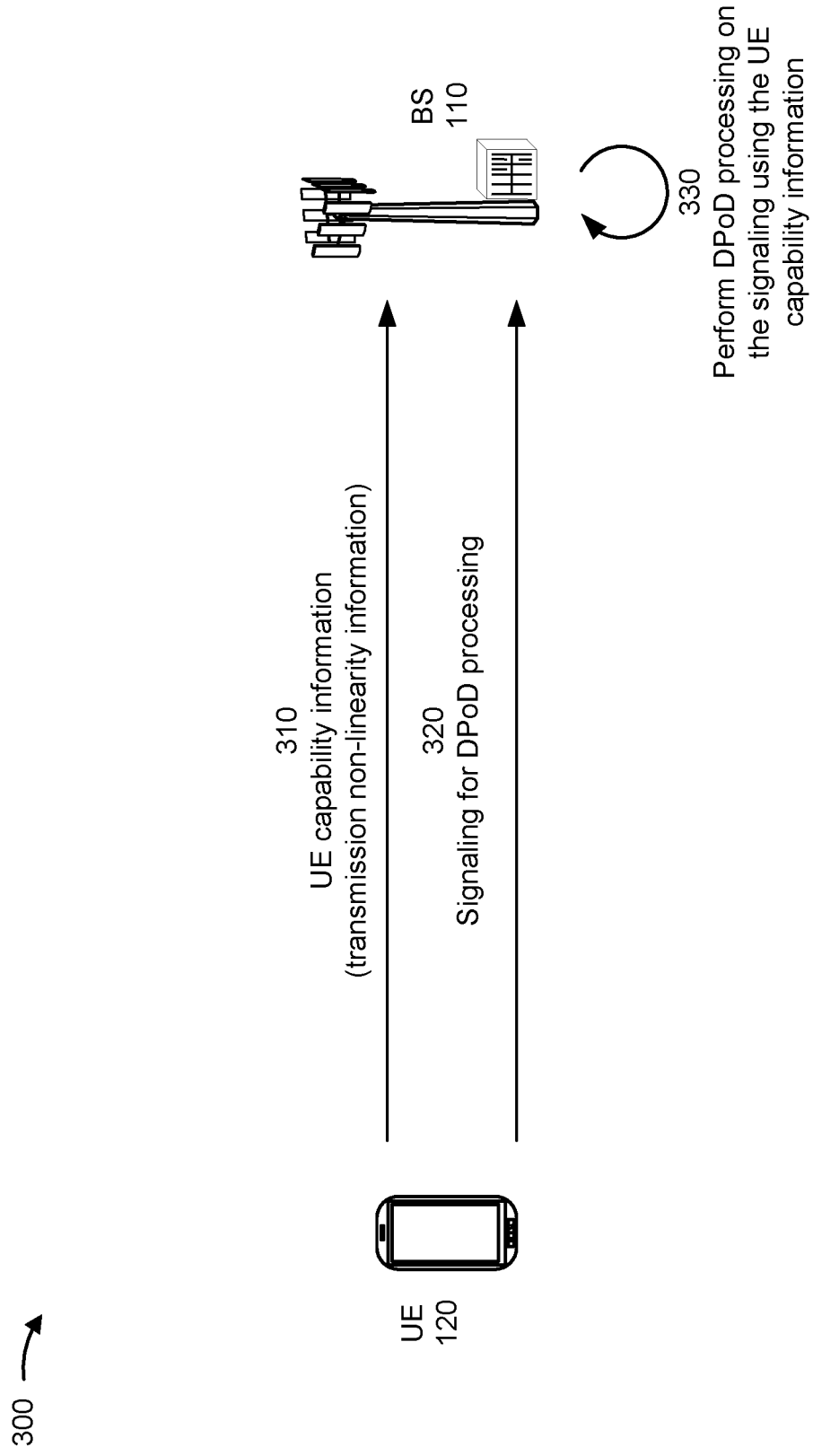
FIG. 3 is a diagram illustrating an example associated with digital post-distortion signaling, in accordance with the present disclosure.

FIG. 3 is a diagram illustrating an example 300 of DPoD processing, in accordance with the present disclosure. As shown in FIG. 3, example 300 includes a BS 110 and a UE 120.

As further shown in FIG. 3, and by reference number 310, UE 120 may transmit UE capability information to BS 110. For example, UE 120 may transmit information identifying a transmission non-linearity for subsequent signaling that is to undergo DPoD processing at BS 110. In some aspects, UE 120 may transmit signaling to BS 110 indicating an ability to compensate for non-linearity in a transmitter of BS 110. For example, UE 120 may indicate that a threshold level of non-linearity compensation is to be performed in UE 120 during transmission of signaling. Additionally, or alternatively, UE 120 may transmit signaling indicating that UE 120 is capable of compressing signaling to enable DPoD processing at BS 110. In this case, when UE 120 is capable of compressing the signaling at a transmitter of UE 120, UE 120 is capable of achieving a power optimization benefit from DPoD processing as described above. In some aspects, UE 120 may indicate a magnitude of signaling compression capable at a transmitter of UE 120. Additionally, or alternatively, UE 120 may indicate a maximum DPoD kernel envelope for non-linearity and/or memory estimation in a DPoD procedure. For example, UE 120 may transmit a bitmap indicating a maximum dimensioning of a non-linearity order. Additionally, or alternatively, UE 120 may transmit information identifying a maximum quantity of memory taps, a bandwidth factor, and/or the like.

In some aspects, UE 120 may transmit UE capability information identifying a non-linearity model of a power amplifier of UE 120. For example, UE 120 may provide information indicating the non-linearity model to BS 110 to enable BS 110 to optimize a DPoD processing algorithm. In this case, based at least in part on receiving the UE capability information, BS 110 may configure the DPoD processing algorithm and/or select from a set of available DPoD processing algorithms to optimize to the power amplifier that UE 120 is using. In this way, UE 120 and BS 110 improve an effectiveness of DPoD processing. In some aspects, BS 110 may transmit an instruction indicating that UE 120 is to use compression and transmit signaling with non-linearity. For example, BS 110 may provide information indicating that BS 110 is configured to perform DPoD processing (and/or that BS 110 is configured to optimize the DPoD processing algorithm based at least in part on the power amplifier of UE 120). In this case, UE 120 may subsequently transmit compressed signaling based at least in part on receiving the information indicating that BS 110 is configured to perform DPoD processing.

As further shown in FIG. 3, and by reference number 320, UE 120 may transmit signaling to BS 110 for DPoD processing. For example, UE 120 may compress signaling in a power amplifier of a transmitter of UE 120 and may transmit the compressed signaling to BS 110. In this case, based at least in part on compressing the signaling, UE 120 increases a level of non-linearity interference, however, BS 110 may perform DPoD processing on received signaling to account for the increased level of non-linearity interference, as shown by reference number 330. As a result, UE 120 achieves improved transmission power efficiency without causing excessive non-linearity related interference and/or clipping.

As indicated above, FIG. 3 is provided as an example. Other examples may differ from what is described with respect to FIG. 3.

Figure 4:
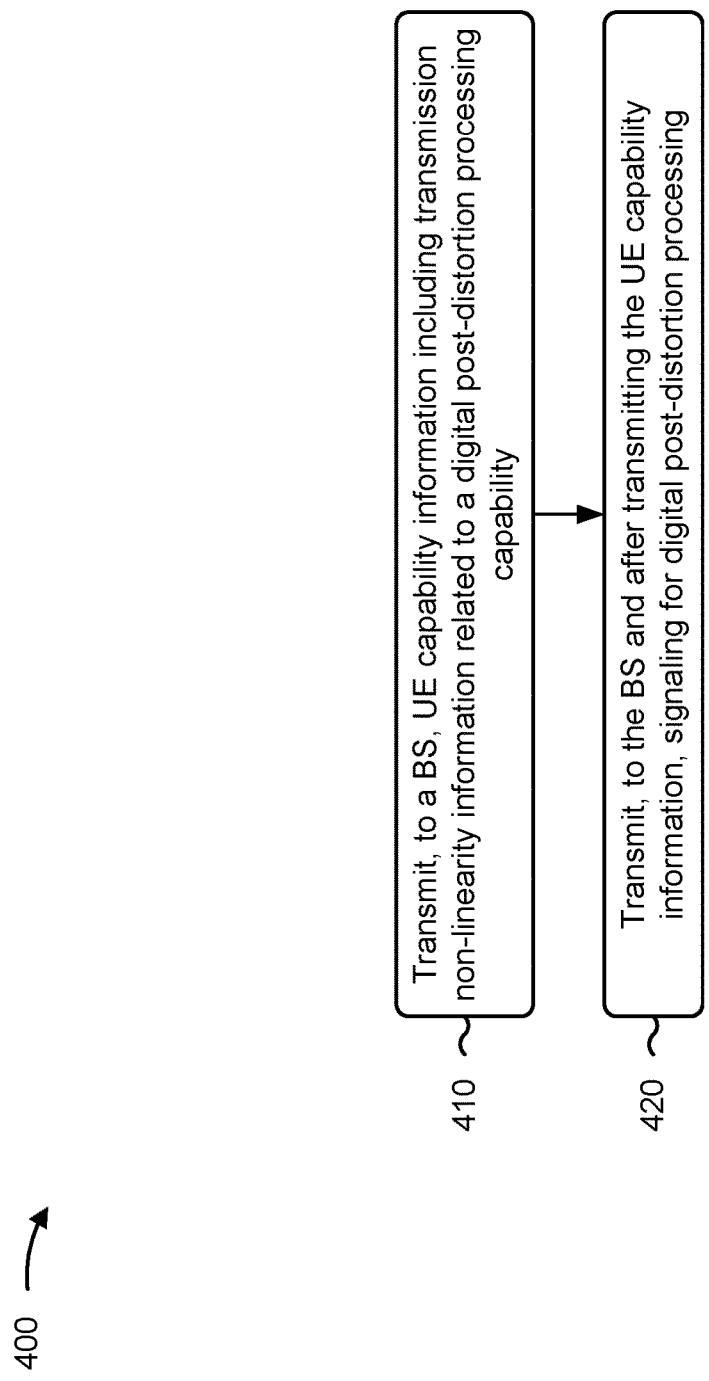
FIGS. 4-5 are diagrams illustrating example processes associated with digital post-distortion signaling, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with digital post-distortion signaling.

As shown in FIG. 4, in some aspects, process 400 may include transmitting, to a base station (BS), UE capability information including transmission non-linearity information related to a digital post-distortion processing capability (block 410). For example, the UE (e.g., using receive processor 258, transmit processor 264, controller/processor 280, memory 282, and/or the like) may transmit, to a base station (BS), UE capability information including transmission non-linearity information related to a digital post-distortion processing capability, as described above.

As further shown in FIG. 4, in some aspects, process 400 may include transmitting, to the BS and after transmitting the UE capability information, signaling for digital post-distortion processing (block 420). For example, the UE (e.g., using receive processor 258, transmit processor 264, controller/processor 280, memory 282, and/or the like) may transmit, to the BS and after transmitting the UE capability information, signaling for digital post-distortion processing, as described above.

Process 400 may include additional aspects, such as any single aspect or any combination of aspects described below and/or in connection with one or more other processes described elsewhere herein.

In a first aspect, the UE capability information identifies a non-linearity compensation capability.

In a second aspect, alone or in combination with the first aspect, the UE capability information identifies a magnitude of non-linearity that is compensable using the non-linearity compensation capability.

In a third aspect, alone or in combination with one or more of the first and second aspects, transmitting the signaling for digital post-distortion processing includes transmitting compressed signaling based at least in part on receiving the signal compression capability indication.

In a fourth aspect, alone or in combination with one or more of the first through third aspects, process 400 includes communicating with the BS to identify a digital post-distortion processing set of kernels for digital post-distortion processing, and transmitting the signaling includes transmitting signaling for processing using a digital post-distortion processing kernel not larger than the identified digital post-distortion processing set of kernels.

In a fifth aspect, alone or in combination with one or more of the first through fourth aspects, the signaling is processed for non-linearity estimation and memory estimation to recover information conveyed by the signaling.

In a sixth aspect, alone or in combination with one or more of the first through fifth aspects, the UE capability information is a physical parameter indicating whether the UE supports uplink transmission power amplifier non-linearity.

In a seventh aspect, alone or in combination with one or more of the first through sixth aspects, the UE capability information is included in a bit map.

In an eighth aspect, alone or in combination with one or more of the first through seventh aspects, the UE capability information includes information identifying a bandwidth parameter indicating a memory tap configuration.

In a ninth aspect, alone or in combination with one or more of the first through eighth aspects, the UE capability information includes information identifying a digital post-distortion processing model to use for processing the signaling.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
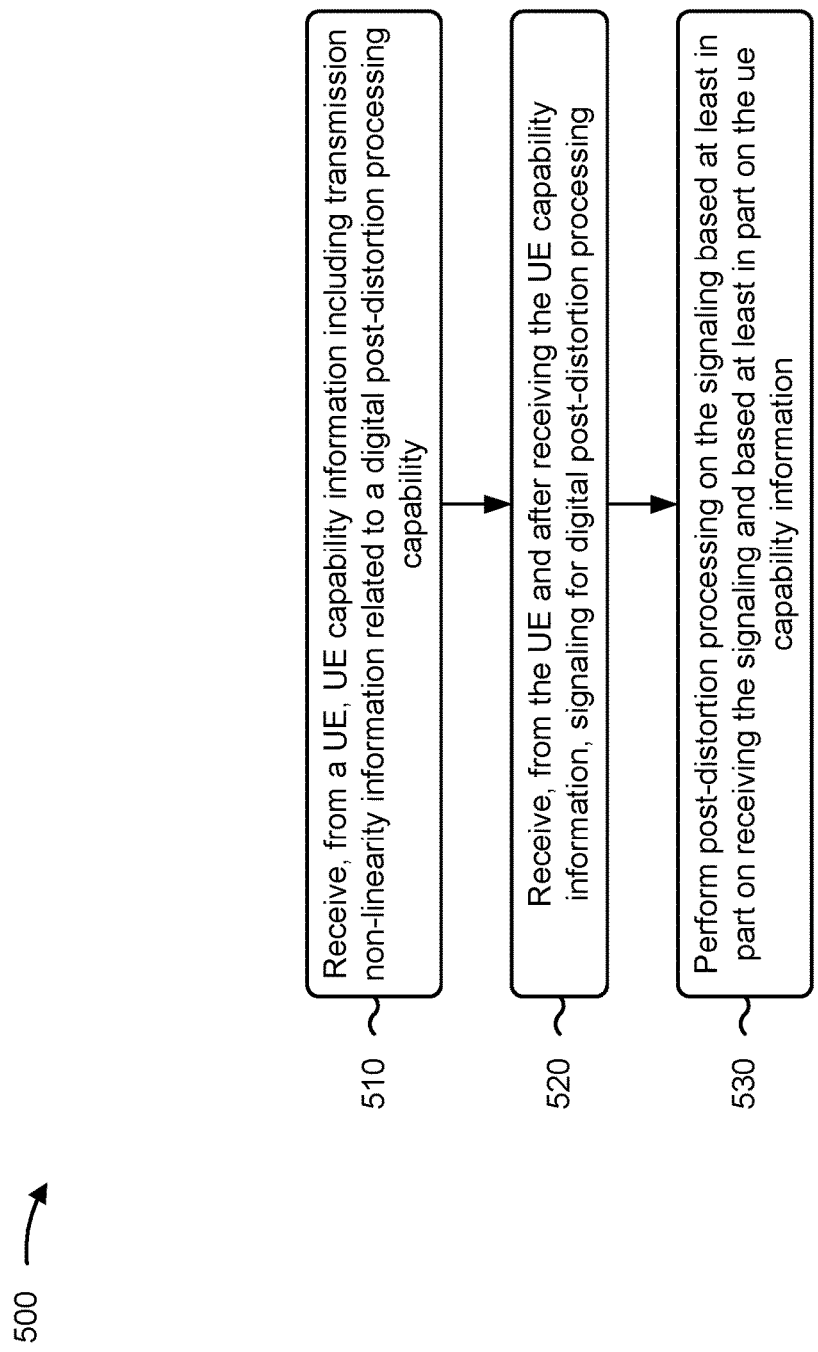

FIG. 5 is a diagram illustrating an example process 500 performed, for example, by a BS, in accordance with the present disclosure. Example process 500 is an example where the BS (e.g., BS 110 and/or the like) performs operations associated with digital post-distortion signaling.

As shown in FIG. 5, in some aspects, process 500 may include receiving, from a UE, UE capability information including transmission non-linearity information related to a digital post-distortion processing capability (block 510). For example, the BS (e.g., using transmit processor 220, receive processor 238, controller/processor 240, memory 242, and/or the like) may receive, from a user equipment (UE), UE capability information including transmission non-linearity information related to a digital post-distortion processing capability, as described above.

As further shown in FIG. 5, in some aspects, process 500 may include receiving, from the UE and after receiving the UE capability information, signaling for digital post-distortion processing (block 520). For example, the BS (e.g., using transmit processor 220, receive processor 238, controller/processor 240, memory 242, and/or the like) may receive, from the UE and after receiving the UE capability information, signaling for digital post-distortion processing, as described above.

As further shown in FIG. 5, in some aspects, process 500 may include performing post-distortion processing on the signaling based at least in part on receiving the signaling and based at least in part on the UE capability information (block 530). For example, the BS (e.g., using transmit processor 220, receive processor 238, controller/processor 240, memory 242, and/or the like) may perform post-distortion processing on the signaling based at least in part on receiving the signaling and based at least in part on the UE capability information, as described above.

Process 500 may include additional aspects, such as any single aspect or any combination of aspects described below and/or in connection with one or more other processes described elsewhere herein.

In a first aspect, process 500 includes setting a post-distortion processing configuration based at least in part on the transmission non-linearity information.

In a second aspect, alone or in combination with the first aspect, process 500 includes transmitting information indicating the digital post-distortion processing capability based at least in part on receiving the UE capability information, and receiving the signaling for digital post-distortion processing includes receiving the signaling based at least in part on transmitting the information indicating the digital post-distortion processing capability.

In a third aspect, alone or in combination with one or more of the first and second aspects, the UE capability information identifies a non-linearity compensation capability.

In a fourth aspect, alone or in combination with one or more of the first through third aspects, the UE capability information identifies a magnitude of the non-linearity compensation capability.

In a fifth aspect, alone or in combination with one or more of the first through fourth aspects, receiving the signaling for digital post-distortion processing includes receiving compressed signaling based at least in part on transmitting the signal compression capability indication.

In a sixth aspect, alone or in combination with one or more of the first through fifth aspects, process 500 includes communicating with the BS to identify a digital post-distortion processing set of kernels for digital post-distortion processing, and performing post-distortion processing includes performing post-distortion processing using a digital post-distortion processing kernel not larger than the identified digital post-distortion processing set of kernels.

In a seventh aspect, alone or in combination with one or more of the first through sixth aspects, the signaling is processed for non-linearity estimation and memory estimation to recover information conveyed by the signaling.

In an eighth aspect, alone or in combination with one or more of the first through seventh aspects, the UE capability information is a physical parameter indicating whether the UE supports uplink transmission power amplifier non-linearity.

In a ninth aspect, alone or in combination with one or more of the first through eighth aspects, the UE capability information is included in a bit map.

In a tenth aspect, alone or in combination with one or more of the first through ninth aspects, the UE capability information includes information identifying a bandwidth parameter indicating a memory tap configuration.

In an eleventh aspect, alone or in combination with one or more of the first through tenth aspects, the UE capability information includes information identifying a digital post-distortion processing model to use for processing the signaling.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
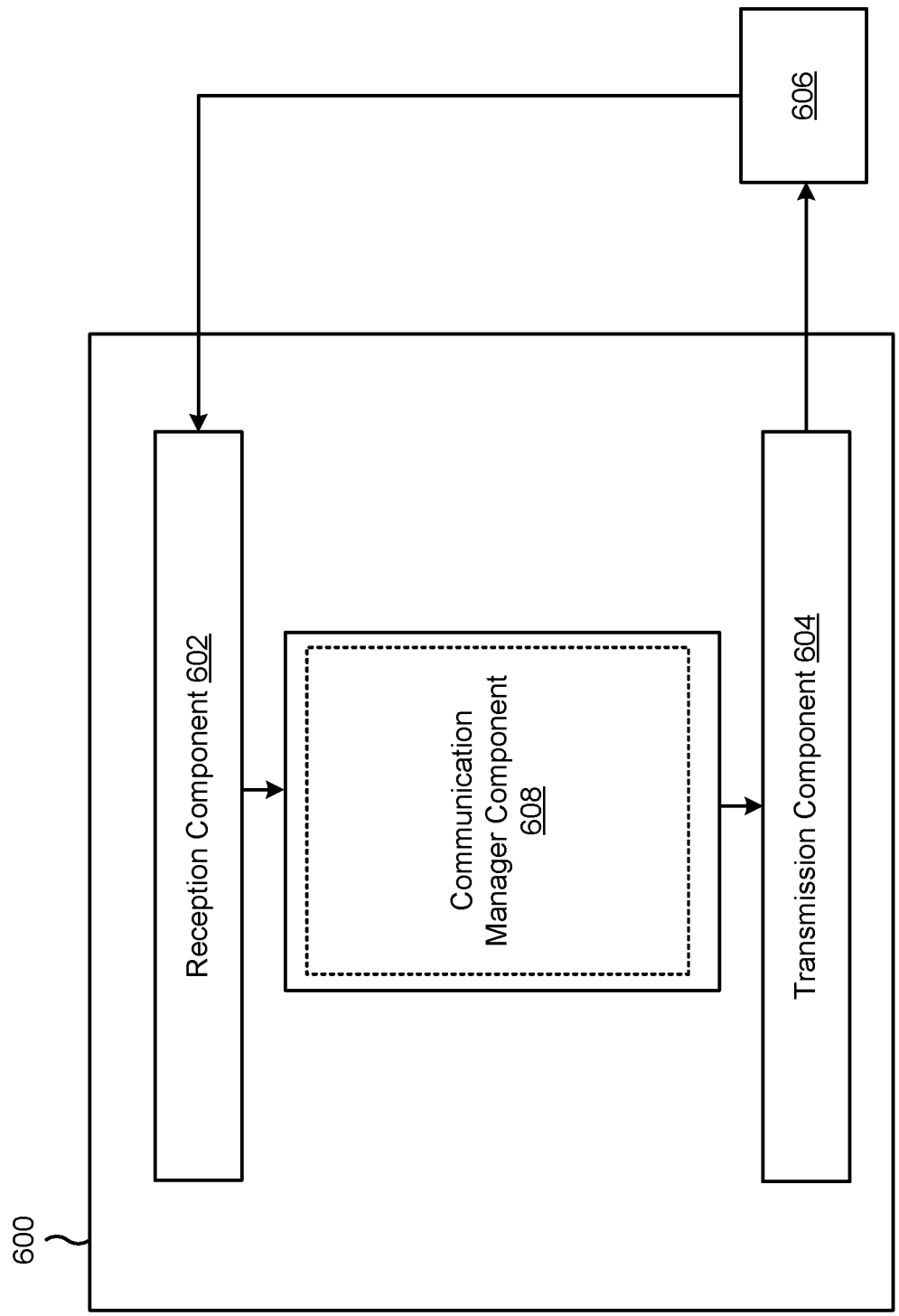
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a communication manager component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The transmission component 604 may transmit, to a BS, UE capability information including transmission non-linearity information related to a digital post-distortion processing capability. The transmission component 604 may transmit, to the BS and after transmitting the UE capability information, signaling for digital post-distortion processing. The reception component 602 may receive, from the BS, a signal compression capability indication. The reception component 602 and/or the transmission component 604 may communicate with the BS to identify a digital post-distortion processing set of kernels for digital post-distortion processing. The communication manager component 608 may cause the transmission component 604 to transmit and/or the reception component 602 to receive in accordance with a stored or determined configuration.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
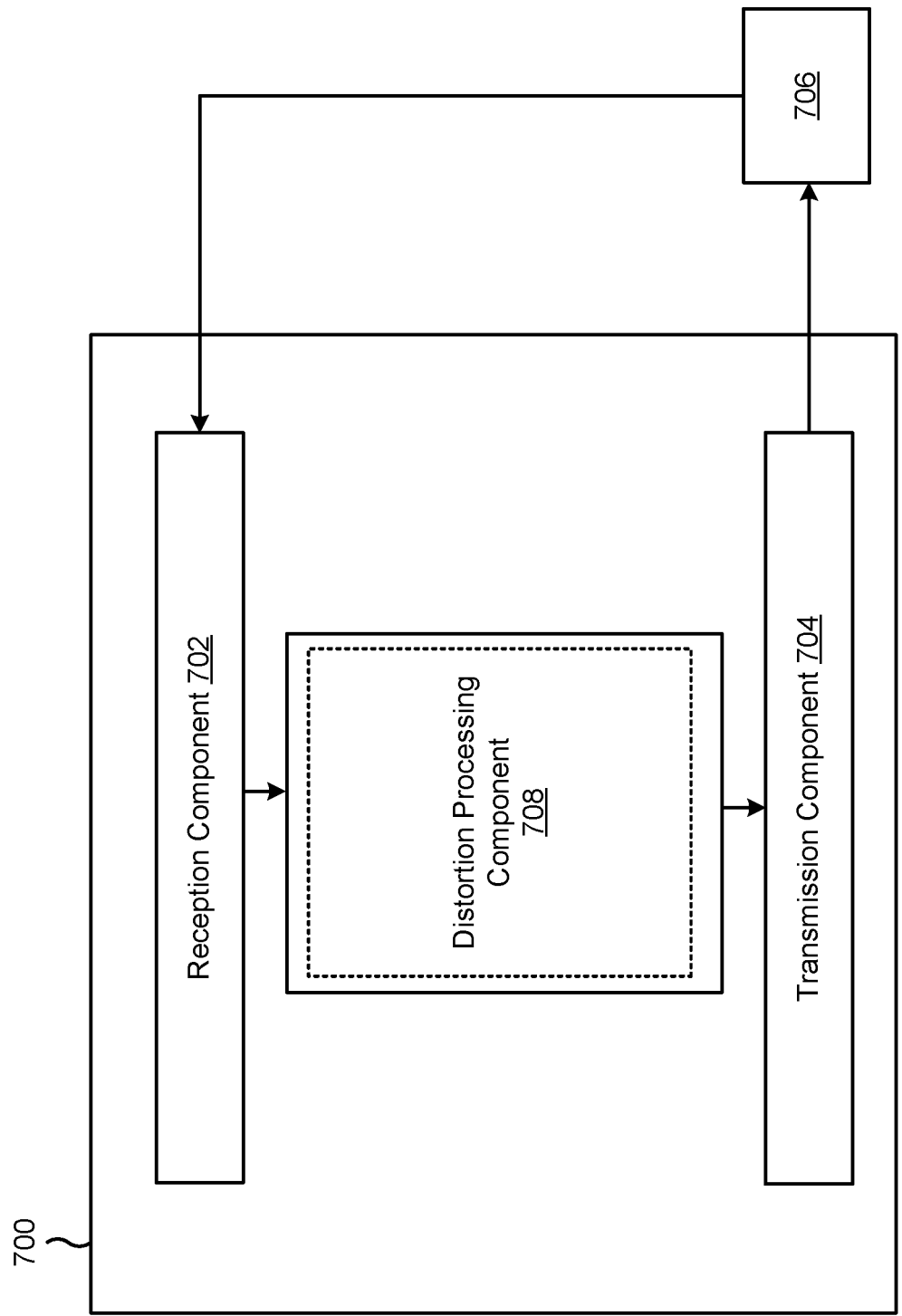

FIG. 7 is a block diagram of an example apparatus 700 for wireless communication. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a distortion processing component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The reception component 702 may receive, from a UE, UE capability information including transmission non-linearity information related to a digital post-distortion processing capability. The reception component 702 may receive, from the UE and after receiving the UE capability information, signaling for digital post-distortion processing. The distortion processing component 708 may perform post-distortion processing on the signaling based at least in part on receiving the signaling and based at least in part on the UE capability information.

The distortion processing component 708 may set a post-distortion processing configuration based at least in part on the transmission non-linearity information. The transmission component 704 may transmit information indicating the digital post-distortion processing capability based at least in part on receiving the UE capability information. The transmission component 704 may transmit a signal compression capability indication. The reception component 702 and/or the transmission component 704 may communicate with the UE to identify a digital post-distortion processing set of kernels for digital post-distortion processing.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting, to a base station (BS), UE capability information including transmission non-linearity information related to a digital post-distortion processing capability; and transmitting, to the BS and after transmitting the UE capability information, signaling for digital post-distortion processing.

Aspect 2: The method of Aspect 1, wherein the UE capability information identifies a non-linearity compensation capability.

Aspect 3: The method of Aspect 2, wherein the UE capability information identifies a magnitude of non-linearity that is compensable using the non-linearity compensation capability.

Aspect 4: The method of any of Aspects 1 to 3, further comprising: receiving, from the BS, a signal compression capability indication; and wherein transmitting the signaling for digital post-distortion processing comprises: transmitting compressed signaling based at least in part on receiving the signal compression capability indication.

Aspect 5: The method of any of Aspects 1 to 4, further comprising: communicating with the BS to identify a digital post-distortion processing set of kernels for digital post-distortion processing; and wherein transmitting the signaling comprises: transmitting signaling for processing using a digital post-distortion processing kernel not larger than the identified digital post-distortion processing set of kernels.

Aspect 6: The method of any of Aspects 1 to 5, wherein the signaling is processed for non-linearity estimation and memory estimation to recover information conveyed by the signaling.

Aspect 7: The method of any of Aspects 1 to 6, wherein the UE capability information is a physical parameter indicating whether the UE supports uplink transmission power amplifier non-linearity.

Aspect 8: The method of any of Aspects 1 to 7, wherein the UE capability information is included in a bit map.

Aspect 9: The method of any of Aspects 1 to 8, wherein the UE capability information includes information identifying a bandwidth parameter indicating a memory tap configuration.

Aspect 10: The method of any of Aspects 1 to 9, wherein the UE capability information includes information identifying a digital post-distortion processing model to use for processing the signaling.

Aspect 11: A method of wireless communication performed by a base station (BS), comprising: receiving, from a user equipment (UE), UE capability information including transmission non-linearity information related to a digital post-distortion processing capability; receiving, from the UE and after receiving the UE capability information, signaling for digital post-distortion processing; and performing post-distortion processing on the signaling based at least in part on receiving the signaling and based at least in part on the UE capability information.

Aspect 12: The method of Aspect 11, further comprising: setting a post-distortion processing configuration based at least in part on the transmission non-linearity information.

Aspect 13: The method of any of Aspects 11 to 12, further comprising: transmitting information indicating the digital post-distortion processing capability based at least in part on receiving the UE capability information; and wherein receiving the signaling for digital post-distortion processing comprising: receiving the signaling based at least in part on transmitting the information indicating the digital post-distortion processing capability.

Aspect 14: The method of any of Aspects 11 to 13, wherein the UE capability information identifies a non-linearity compensation capability.

Aspect 15: The method of Aspect 14, wherein the UE capability information identifies a magnitude of the non-linearity compensation capability.

Aspect 16: The method of any of Aspects 11 to 15, further comprising: transmitting a signal compression capability indication; and wherein receiving the signaling for digital post-distortion processing comprises: receiving compressed signaling based at least in part on transmitting the signal compression capability indication.

Aspect 17: The method of any of Aspects 11 to 16, further comprising: communicating with the UE to identify a digital post-distortion processing set of kernels for digital post-distortion processing; and wherein performing post-distortion processing comprises: performing post-distortion processing using a digital post-distortion processing kernel not larger than the identified digital post-distortion processing set of kernels.

Aspect 18: The method of any of Aspects 11 to 17, wherein the signaling is processed for non-linearity estimation and memory estimation to recover information conveyed by the signaling.

Aspect 19: The method of any of Aspects 11 to 19, wherein the UE capability information is a physical parameter indicating whether the UE supports uplink transmission power amplifier non-linearity.

Aspect 20: The method of any of Aspects 11 to 20, wherein the UE capability information is included in a bit map.

Aspect 21: The method of any of Aspects 11 to 21, wherein the UE capability information includes information identifying a bandwidth parameter indicating a memory tap configuration.

Aspect 22: The method of any of Aspects 11 to 22, wherein the UE capability information includes information identifying a digital post-distortion processing model to use for processing the signaling.

Aspect 23: An apparatus for wireless communication at a device, comprising a processor; memory coupled with the processor; and instructions stored in the memory and executable by the processor to cause the apparatus to perform the method of one or more Aspects of Aspects 1-10.

Aspect 24: A device for wireless communication, comprising a memory and one or more processors coupled to the memory, the memory and the one or more processors configured to perform the method of one or more Aspects of Aspects 1-10.

Aspect 25: An apparatus for wireless communication, comprising at least one means for performing the method of one or more Aspects of Aspects 1-10.

Aspect 26: A non-transitory computer-readable medium storing code for wireless communication, the code comprising instructions executable by a processor to perform the method of one or more Aspects of Aspects 1-10.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 28: An apparatus for wireless communication at a device, comprising a processor; memory coupled with the processor; and instructions stored in the memory and executable by the processor to cause the apparatus to perform the method of one or more Aspects of Aspects 11-22.

Aspect 29: A device for wireless communication, comprising a memory and one or more processors coupled to the memory, the memory and the one or more processors configured to perform the method of one or more Aspects of Aspects 11-22.

Aspect 30: An apparatus for wireless communication, comprising at least one means for performing the method of one or more Aspects of Aspects 11-22.

Aspect 31: A non-transitory computer-readable medium storing code for wireless communication, the code comprising instructions executable by a processor to perform the method of one or more Aspects of Aspects 11-22.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 11-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to cause the UE to:
      transmit, to a network entity, UE capability information that identifies a transmission non-linearity for subsequent signaling and that indicates:
         a digital post-distortion capability of the UE to compress the subsequent signaling at a transmitter of the UE for digital post-distortion processing at the network entity, wherein the digital post-distortion capability comprises a magnitude of signaling compression capable at the transmitter of the UE;
         an ability of the UE to compensate for a non-linearity in a transmitter of the network entity;
         a threshold level of compensation for the transmission non-linearity that is to be performed in the UE during transmission of the subsequent signaling;
         a capability of achieving a power optimization benefit from the digital post-distortion processing;
         a maximum digital post-distortion processing kernel envelope for one or more of non-linearity or memory estimation in the digital post-distortion processing;
         a bitmap indicating a maximum dimensioning of a non-linearity order;
         a maximum quantity of memory taps; and
         a bandwidth factor; and
      transmit, to the network entity and after a transmission of the UE capability information, the subsequent signaling with signaling compression for the digital post-distortion processing at the network entity.

2. The UE of claim 1, wherein the UE capability information identifies a magnitude of non-linearity that is compensable by the UE.

3. The UE of claim 1, wherein the one or more processors are further configured to cause the UE to:
   receive, from the network entity, a signal compression capability indication; and
   wherein the one or more processors, to transmit the subsequent signaling, are configured to cause the UE to:
      transmit the subsequent signaling with the signaling compression based at least in part on receiving the signal compression capability indication.

4. The UE of claim 1, wherein the one or more processors are further configured to cause the UE to:
   communicate with the network entity to identify a digital post-distortion processing set of kernels; and
   wherein the one or more processors, to transmit the subsequent signaling, are configured to cause the UE to:
      transmit the subsequent signaling for processing using a digital post-distortion processing kernel not larger than the digital post-distortion processing set of kernels.

5. The UE of claim 1, wherein the subsequent signaling is processed for non-linearity estimation and memory estimation to recover information conveyed by the subsequent signaling.

6. The UE of claim 1, wherein the UE capability information comprises a physical parameter indicating whether the UE supports uplink transmission power amplifier non-linearity.

7. The UE of claim 1, wherein the UE capability information includes information identifying a bandwidth parameter indicating a memory tap configuration.

8. The UE of claim 1, wherein the UE capability information includes information identifying a digital post-distortion processing model to use for processing the subsequent signaling.

9. The UE of claim 1, wherein the UE capability information identifies a non-linearity model of a power amplifier of the UE.

10. The UE of claim 1, wherein the one or more processors are further configured to cause the UE to:
   receive information indicating that the network entity is configured to perform the digital post-distortion processing using a digital post-distortion processing algorithm selected from a set of available digital post-distortion processing algorithms.

11. The UE of claim 1, wherein the one or more processors are further configured to cause the UE to:
   receive information indicating that the network entity is configured to optimize a digital post-distortion processing algorithm based at least in part on a power amplifier of the UE.

12. A network entity for wireless communication, comprising:
   one or more memories; and
   one or more processors, coupled to the one or more memories, configured to cause the network entity to:
      receive, from a user equipment (UE), UE capability information identifying a transmission non-linearity for subsequent signaling and that that indicates:
         a digital post-distortion capability of the UE to compress the subsequent signaling at a transmitter of the UE for digital post-distortion processing at the network entity, wherein the digital post-distortion capability comprises a magnitude of signaling compression capable at the transmitter of the UE;
         an ability of the UE to compensate for a non-linearity in a transmitter of the network entity;
         a threshold level of compensation for the transmission non-linearity that is to be performed in the UE during transmission of the subsequent signaling;
         a capability of achieving a power optimization benefit from the digital post-distortion processing;
         a maximum digital post-distortion processing kernel envelope for one or more of non-linearity or memory estimation in the digital post-distortion processing;
         a bitmap indicating a maximum dimensioning of a non-linearity order;
         a maximum quantity of memory taps; and
         a bandwidth factor;
      select, based on the UE capability information, a digital post-distortion processing algorithm, from a set of available processing algorithms, for the digital post-distortion processing of the subsequent signaling;
      receive, from the UE, the subsequent signaling with signaling compression; and
      perform, using the digital post-distortion processing algorithm, the digital post-distortion processing on the subsequent signaling based at least in part on the signaling compression of the subsequent signaling.

13. The network entity of claim 12, wherein the one or more processors are further configured to cause the network entity to:
set a post-distortion processing configuration based at least in part on the transmission non-linearity.

14. The network entity of claim 12, wherein the one or more processors are further configured to cause the network entity to:
transmit information indicating the digital post-distortion processing based at least in part on the UE capability information; and
wherein the one or more processors, to receive the subsequent signaling, are configured to cause the network entity to:
receive the subsequent signaling based at least in part on the information indicating the digital post-distortion processing.

15. The network entity of claim 12, wherein the UE capability information identifies a magnitude of non-linearity that is compensable by the UE.

16. The network entity of claim 12, wherein the one or more processors are further configured to cause the network entity to:
transmit a signal compression capability indication; and
wherein the one or more processors, to receive the subsequent signaling, are configured to cause the network entity to:
receive the subsequent signaling with the signaling compression based at least in part on the signal compression capability indication.

17. The network entity of claim 12, wherein the one or more processors are further configured to cause the network entity to:
communicate with the UE to identify a digital post-distortion processing set of kernels; and
wherein the one or more processors, to perform the digital post-distortion processing, are configured to cause the network entity to:
perform the digital post-distortion processing using a digital post-distortion processing kernel not larger than the digital post-distortion processing set of kernels.

18. The network entity of claim 12, wherein the subsequent signaling is processed for non-linearity estimation and memory estimation to recover information conveyed by the subsequent signaling.

19. The network entity of claim 12, wherein the UE capability information comprises a physical parameter indicating whether the UE supports uplink transmission power amplifier non-linearity.

20. The network entity of claim 12, wherein the UE capability information includes information identifying a bandwidth parameter indicating a memory tap configuration.

21. The network entity of claim 12, wherein the UE capability information includes information identifying a digital post-distortion processing model to use for processing the subsequent signaling.

22. The network entity of claim 12, wherein the one or more processors are further configured to cause the network entity to:
transmit information indicating that the network entity is configured to perform the digital post-distortion processing using a digital post-distortion processing algorithm selected from a set of available digital post-distortion processing algorithms.

23. The network entity of claim 12, wherein the one or more processors are further configured to cause the network entity to:
transmit information indicating that the network entity is configured to optimize a digital post-distortion processing algorithm based at least in part on a power amplifier of the UE.

24. The network entity of claim 12, wherein the UE capability information identifies a non-linearity model of a power amplifier of the UE.

25. A method of wireless communication performed by a user equipment (UE), comprising:
transmitting, to a network entity, UE capability information that identifies a transmission non-linearity for subsequent signaling and that that indicates;
a digital post-distortion capability of the UE to compress the subsequent signaling at a transmitter of the UE for digital post-distortion processing at the network entity, wherein the digital post-distortion capability comprises a magnitude of signaling compression capable at the transmitter of the UE;
an ability of the UE to compensate for a non-linearity in a transmitter of the network entity;
a threshold level of compensation for the transmission non-linearity that is to be performed in the UE during transmission of the subsequent signaling;
a capability of achieving a power optimization benefit from the digital post-distortion processing;
a maximum digital post-distortion processing kernel envelope for one or more of non-linearity or memory estimation in the digital post-distortion processing;
a bitmap indicating a maximum dimensioning of a non-linearity order;
a maximum quantity of memory taps; and
a bandwidth factor; and
transmitting, to the network entity and after a transmission of the UE capability information, the subsequent signaling with signaling compression for the digital post-distortion processing at the network entity.

26. The method of claim 25, wherein the UE capability information identifies a magnitude of non-linearity that is compensable by the UE.

27. The method of claim 25, further comprising:
receiving, from the network entity, a signal compression capability indication; and
wherein transmitting the subsequent signaling comprises:
transmitting the subsequent signaling with the signaling compression based at least in part on receiving the signal compression capability indication.

28. The method of claim 25, wherein the UE capability information identifies a non-linearity model of a power amplifier of the UE.

29. The method of claim 25, further comprising:
receiving information indicating that the network entity is configured to perform the digital post-distortion processing using a digital post-distortion processing algorithm selected from a set of available digital post-distortion processing algorithms.

30. The method of claim 25, further comprising:
receiving information indicating that the network entity is configured to optimize a digital post-distortion processing algorithm based at least in part on a power amplifier of the UE.

31. A method of wireless communication performed by a network entity, comprising:
  receiving, from a user equipment (UE), UE capability information identifying a transmission non-linearity for subsequent signaling and that that indicates;
    a digital post-distortion capability of the UE to compress the subsequent signaling at a transmitter of the UE for digital post-distortion processing at the network entity, wherein the digital post-distortion capability comprises a magnitude of signaling compression capable at the transmitter of the UE;
    an ability of the UE to compensate for a non-linearity in a transmitter of the network entity;
    a threshold level of compensation for the transmission non-linearity that is to be performed in the UE during transmission of the subsequent signaling;
    a capability of achieving a power optimization benefit from the digital post-distortion processing;
    a maximum digital post-distortion processing kernel envelope for one or more of non-linearity or memory estimation in the digital post-distortion processing;
    a bitmap indicating a maximum dimensioning of a non-linearity order;
    a maximum quantity of memory taps; and
    a bandwidth factor;
  selecting, based on the UE capability information, a digital post-distortion processing algorithm, from a set of available processing algorithms, for the digital post-distortion processing of the subsequent signaling;
  receiving, from the UE, the subsequent signaling with signaling compression; and
  performing the digital post-distortion processing on the subsequent signaling based at least in part on the signaling compression of the subsequent signaling.

32. The method of claim 31, further comprising:
setting a post-distortion processing configuration based at least in part on the transmission non-linearity.

33. The method of claim 31, further comprising:
transmitting information indicating the digital post-distortion processing based at least in part on receiving the UE capability information; and
wherein receiving the subsequent signaling comprises:
  receiving the subsequent signaling based at least in part on transmitting the information indicating the digital post-distortion processing.

* * * * *